United States Patent
Paine et al.

(10) Patent No.: US 11,035,743 B2
(45) Date of Patent: Jun. 15, 2021

(54) COMPACT, HIGH PERFORMANCE SERIES ELASTIC ACTUATOR

(71) Applicant: Apptronik, Inc., Austin, TX (US)

(72) Inventors: Nicholas Paine, Austin, TX (US); Jonas Fox, Austin, TX (US); Bradley Resh, Austin, TX (US)

(73) Assignee: APPTRONIK, INC., Austin, TX (US)

( * ) Notice: Subject to any disclaimer, the term of this patent is extended or adjusted under 35 U.S.C. 154(b) by 152 days.

(21) Appl. No.: 16/297,205

(22) Filed: Mar. 8, 2019

(65) Prior Publication Data

US 2019/0277712 A1    Sep. 12, 2019

Related U.S. Application Data

(60) Provisional application No. 62/640,070, filed on Mar. 8, 2018.

(51) Int. Cl.
| | |
|---|---|
| *G01L 1/04* | (2006.01) |
| *B25J 13/08* | (2006.01) |
| *H02K 11/24* | (2016.01) |
| *H02K 7/06* | (2006.01) |
| *H02K 7/10* | (2006.01) |
| *F16H 57/025* | (2012.01) |

(52) U.S. Cl.
CPC .............. *G01L 1/04* (2013.01); *B25J 13/085* (2013.01); *H02K 7/06* (2013.01); *H02K 7/1004* (2013.01); *H02K 11/24* (2016.01); *F16H 57/025* (2013.01)

(58) Field of Classification Search
CPC ............................ F16H 25/2021; H02K 7/06
See application file for complete search history.

(56) References Cited

U.S. PATENT DOCUMENTS

| | | | | |
|---|---|---|---|---|
| 3,161,074 A | * | 12/1964 | Korthaus | B61G 9/18 74/89.34 |
| 3,369,087 A | * | 2/1968 | Eller | B23Q 11/04 200/47 |
| 3,682,283 A | * | 8/1972 | Sato | B23Q 11/04 192/141 |
| 4,440,035 A | * | 4/1984 | Foulk | F16D 28/00 464/46 |
| 4,463,291 A | * | 7/1984 | Usry | G05D 3/18 310/83 |

(Continued)

OTHER PUBLICATIONS

Paine et al., "Design and Control Considerations for High-Performance Series Elastic Actuators", IEEE Transactions on Mechatronics, vol. 19, No. 3, Jun. 2014, 12 pgs.

(Continued)

*Primary Examiner* — Terence Boes
(74) *Attorney, Agent, or Firm* — Sprinkle IP Law Group (57) ABSTRACT

Embodiments of a series elastic actuator (SEA) disclosed herein include an elastic component coupled in series with a motor, wherein the elastic component comprises a pair of springs arranged concentrically around a central shaft of the housing for transmitting force to a mechanical ground of the SEA, and one or more spring support mechanisms arranged within an inner circumference of the springs. Some embodiments of the SEA may also include a spring deflection sensor, which is coupled within a recess formed within the mechanical ground of the SEA and configured to sense the force transmitted to the mechanical ground of the SEA.

21 Claims, 7 Drawing Sheets

(56) References Cited

U.S. PATENT DOCUMENTS

| | | | |
|---|---|---|---|
| 9,239,100 B1 | 1/2016 | Weber et al. | |
| 2014/0326089 A1* | 11/2014 | Wu | F16H 25/2021 |
| | | | 74/89.23 |
| 2017/0160713 A1* | 6/2017 | Pietrusinski | G05B 19/042 |
| 2017/0341227 A1 | 11/2017 | Sentis et al. | |
| 2018/0123424 A1* | 5/2018 | Wang | A61F 2/64 |
| 2018/0259045 A1* | 9/2018 | Matsumoto | F16H 25/24 |

OTHER PUBLICATIONS

Paine et al, "A New Prismatic Series Elastic Actuator With Compact Size and High Performance", IEEE, 2012, 8 pgs.

* cited by examiner

COMPACT, HIGH PERFORMANCE SERIES ELASTIC ACTUATOR

PRIORITY CLAIM

This application is a continuation of and claims priority to U.S. Provisional Application No. 62/640,070, filed on Mar. 8, 2018 and entitled "Compact, High Performance Series Elastic Actuator" the entire disclosure of which is incorporated herein by reference.

FIELD

This invention relates generally to actuator design, and more particularly, to a compact, high performance series elastic actuator (SEA) design.

BACKGROUND

Conventional robotic systems (including, e.g., industrial automation robotic systems, human interactive robotic systems, wearable robotic systems, aerospace robotic systems, etc.) use actuation based on electric motors to produce motion. Electric motors require a gearbox to amplify torque to appropriate levels for robotic tasks. These gearboxes create large reflected inertia for the actuator, meaning it is easy for the electric motor to move the environment but difficult for the environment to move the electric motor. This is one motivation for a class of actuators referred to Series Elastic Actuators (SEAs), which place a mechanically compliant element in series with the motor-gearbox to create a "softer" actuator. Compared to rigid actuators, the compliant element gives SEAs several unique properties including, but not limited to, low mechanical output impedance, tolerance to impact loads, increased peak power output, and passive mechanical energy storage. These properties align with the requirements typically placed on robotic actuation systems, such as robustness, high-power output and energy efficiency. As a result, SEAs have been widely adopted in robotic systems and human orthotics.

SEAs typically contain a motor to generate mechanical power, a speed reduction mechanism to amplify motor torque, a compliant or elastic component to sense force, and a transmission mechanism to route mechanical power to the output joint. These components can be chosen and configured in many different ways, producing designs with various tradeoffs which affect the power output, volumetric size, weight, efficiency, back drivability, impact resistance, passive energy storage, backlash, and torque ripple of a SEA. For example, excess actuator weight reduces a robot's whole-body power-to-weight ratio, while large size limits the actuator's applicability in dense high-degree-of-freedom robot designs. As a result, it is often desirable to reduce volumetric size and weight of the SEA, while at the same time, maximizing mechanical output power.

Figure 12:
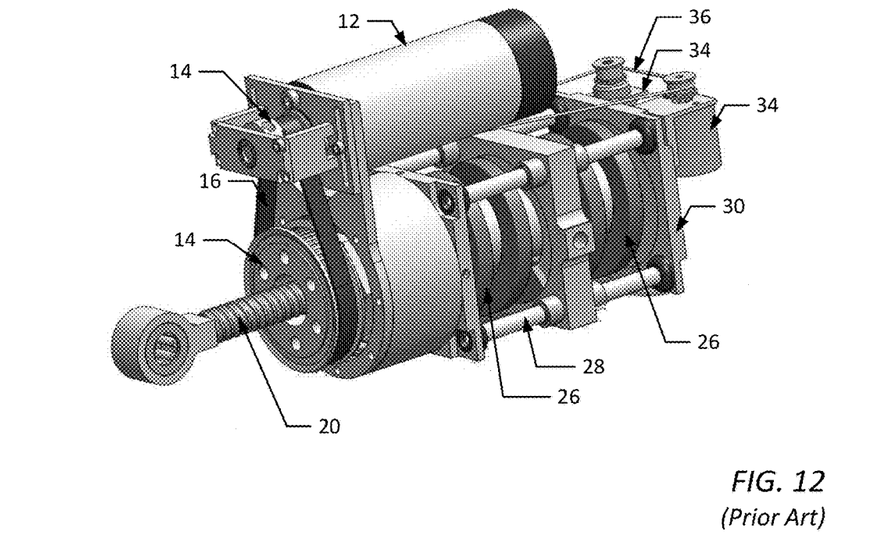
FIG. 12 is a front perspective view of a prior art SEA design.
Figure 13:
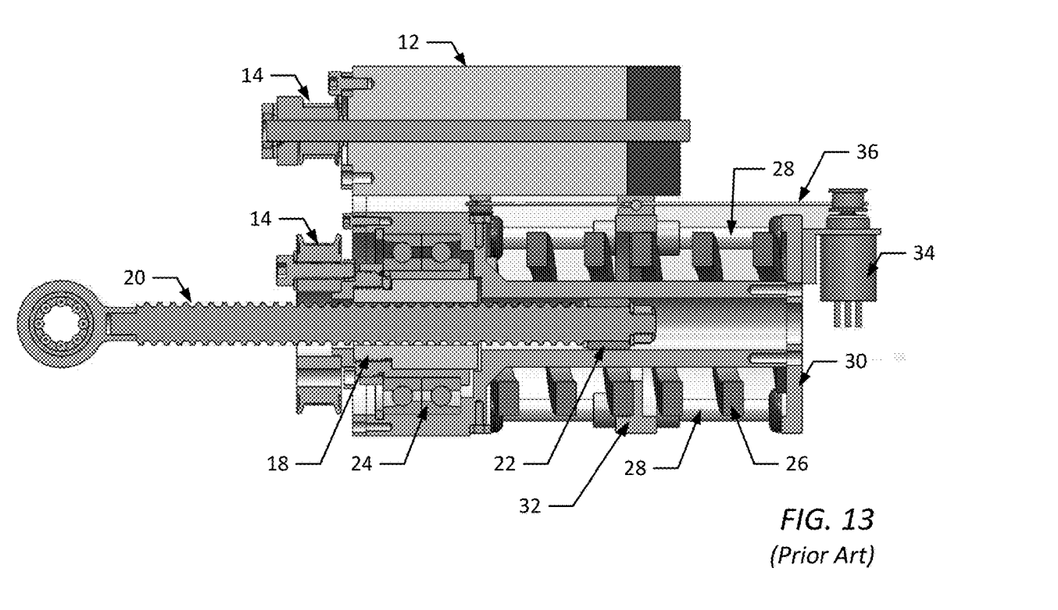
FIG. 13 is a cross-sectional view of the prior art SEA shown in FIG. 12 taken through a longitudinal plane of the SEA.

One example of a prior art SEA 10 design, which provides high mechanical power output in a relatively small and lightweight form factor, is shown in FIGS. 12-13 and described in N. Paine, S. Oh and L. Sentis, "*Design and Control Considerations for High-Performance Series Elastic Actuators*," IEEE/ASME Transactions on Mechatronics, Vol. 19, No. 3, June 2014, pp. 1080-1091, herein incorporated by reference in its entirety. SEA 10 provides improved performance compared to other SEA designs by using a high motor voltage coupled with an efficient drivetrain to enable large continuous actuator force while retaining speed, and achieves a relatively small size by using a piston-style ball screw support mechanism and concentric compliant element.

As shown in FIGS. 12-13, SEA 10 includes an electric motor 12, pulleys 14, belt 16, ball nut 18, ball screw 20, piston-style ball screw support 22, angular contact bearings 24, a pair of concentric springs 26, four spring support mechanisms 28, and two spring deflection sensors 34, among other components. Electric motor 12 converts electrical voltage and current into mechanical velocity and torque, with higher applied voltages resulting in higher velocities and torques. The high motor speed produced by higher applied voltages enables SEA 10 to utilize a large speed reduction, which increases both the intermittent and continuous torque capability of SEA 10 compared to other SEA designs that use lower voltages and lower speed reductions.

The mechanical power generated by electric motor 12 is used to drive ball nut 18 to rotate ball screw 20. In SEA 10, pulleys 14 and belt 16 are coupled between electric motor 12 and ball nut 18 for transmitting energy from the motor to the output joint. The pulley ratio is chosen to provide a large speed reduction (e.g., 3:1), which increases torque capability of the SEA and reduces the high motor speed to a speed more suitable for driving ball screw 20. In addition to being impact resistant and back-drivable, the combination of pulleys 14, belt 16, ball nut 18 and ball screw 20 provide an efficient mechanism that may be used to maximize mechanical power at the joint.

In SEA 10, ball nut 18 is supported by dual angular contact bearings 24, which allow the ball nut to rotate within the actuator housing 30 while transmitting axial force from the ball nut to the housing. The ball screw 20 is incorporated within a central shaft of the actuator housing 30 and supported by a piston-style ball screw support mechanism 22. The pair of springs 26, which are placed concentrically around ball screw support mechanism 22, transmit force to the mechanical ground 32 of the device. This force is sensed by a pair of spring deflection sensors 34, which are mounted behind the springs 26 on the back of the actuator and coupled to the mechanical ground 32 of the device with a cable 36.

In SEA 10, the springs 26 are supported by four spring support mechanisms 28, which are mounted to actuator housing 30 on the outside of the springs 26. In this design, the spring support mechanisms 28 are implemented as miniature ball bearing guide rails, each having a collar that slides on a rail. Opposing ends of each rail are attached to portions of the actuator housing 30, which extend beyond the outer diameter of the springs 26, while the collar is attached to the mechanical ground 32 of the actuator.

While the SEA 10 design shown in FIGS. 12-13 decreases overall actuator volume, compared to other SEA designs, it remains rather bulky and is difficult to assemble and maintain. Specifically, the four miniature ball bearing guide rails 28 and the pair of spring deflection sensors 34 add bulk and overall volume to the SEA design. In addition, the miniature ball bearing guide rails 28 do not provide ball recirculation. If the collar slides too far on the rail, the inner ball portion of the guide rails 28 tend to fall out, thereby requiring frequent maintenance of the SEA 10.

SUMMARY OF THE INVENTION

The following description of various embodiments of actuators is not to be construed in any way as limiting the subject matter of the appended claims.

The present disclosure provides various embodiments of series elastic actuators (SEAs) that provide a compact, lightweight design with improved power density and efficiency. Like prior art SEA designs, the SEA designs described herein may generally include a motor to generate mechanical power, a speed reduction mechanism to amplify motor torque, an elastic component to sense force, and a transmission mechanism to route mechanical power to the output joint. The motor may be coupled to a housing of the SEA, and the elastic component may be placed in series with the motor and coupled between portions of the housing.

In some embodiments disclosed herein, the elastic component of the improved SEA designs may include a pair of springs, which are arranged concentrically around a central shaft of the housing for transmitting force to a mechanical ground of the SEA. The improved SEA designs may also include one or more spring support mechanisms and a spring deflection sensor. Unlike prior art SEA designs, the one or more spring support mechanisms may be arranged within an inner circumference of the springs to provide support for the springs. The type of spring support mechanism used, coupled with the unique placement of the support mechanism inside of the springs, reduces the overall volume of the actuator, improves ease of assembly and eliminates maintenance concerns. In addition, the spring deflection sensor may be coupled within a recess formed within the mechanical ground of the SEA, and may be configured to sense the force transmitted from the springs to the mechanical ground. This further reduces the volume of the actuator and avoids applying significant radial loads to the shaft of the spring deflection sensor A series elastic actuator (SEA) according to a first embodiment may generally include a motor coupled to a housing of the SEA and configured to generate mechanical power, an elastic component coupled in series with the motor, a mechanical ground and one or more spring support mechanisms. The elastic component of the SEA may include a pair of springs, which are arranged concentrically around a central shaft of the housing for transmitting force to the mechanical ground of the SEA. The one or more spring support mechanisms may be arranged within an inner circumference of the springs to support the springs.

The SEA according to the second embodiment may further include a ball nut, a ball screw, a pair of pulleys, a belt and a spring deflection sensor. The ball nut may be arranged within a front portion of the housing and supported by a plurality of ball bearings, which allows the ball nut to rotate within the front portion of the housing. The ball screw may be incorporated within the front portion and the central shaft of the housing, and may be coupled to the ball nut, such that rotation of the ball nut slides the ball screw in and out of the central shaft to compress and expand the pair of springs. The pair of pulleys and belt may be coupled between the motor and the ball nut to transfer the mechanical power generated by the motor to the ball nut and the ball screw. The spring deflection sensor may be coupled within a recess formed within the mechanical ground of the SEA and may be configured to sense the force transmitted from the springs to the mechanical ground of the SEA.

In one embodiment, the one or more spring support mechanisms may include two spring support mechanisms, which are coupled to the central shaft of the housing on opposing sides of the central shaft. Each spring support mechanism may include a guide and a rail. The rail of each spring support mechanism may be coupled to the central shaft of the housing. More specifically, the rail of each spring support mechanism may be coupled within a longitudinal groove formed within the central shaft. The guide of each spring support mechanism may be coupled to the mechanical ground of the SEA, and may be configured to slide along the rail with spring compression and expansion. The mechanical ground of the SEA may be positioned between the pair of springs and arranged concentrically around the central shaft of the housing. Since the spring support mechanisms are arranged within an inner circumference of the springs, as opposed to outside of the springs, a diameter of the mechanical ground may be reduced and made substantially equal to a diameter of the pair of springs.

In another embodiment, the one or more spring support mechanisms may include a single spring support mechanism, which is coupled between a front portion and a rear portion of the housing in place of the central shaft. The single spring support mechanism may be implemented as a ball spline having a spline shaft and a spine nut. The spline shaft may be coupled between the front and rear portions of the housing in place of the central shaft. The spline nut may be coupled to the mechanical ground of the SEA, and may be configured to slide along the spline shaft with compression and expansion of the springs. In contrast to the previous embodiment, the pair of springs and the mechanical ground may be arranged concentrically around the single spring support mechanism, instead of the central shaft used in the previous embodiment. Since the single spring support mechanism is arranged within the inner circumference of the springs, as opposed to outside of the springs, a diameter of the mechanical ground may be reduced and made substantially equal to a diameter of the pair of springs.

A series elastic actuator (SEA) according to a second embodiment may generally include a motor coupled to a housing of the SEA and configured to generate mechanical power, an elastic component coupled in series with the motor, a mechanical ground and a spring deflection sensor. The elastic component of the SEA may include a pair of springs, which are coupled between a front portion and a rear portion of the housing and arranged concentrically around a central shaft of the housing. The mechanical ground may be positioned between the pair of springs and arranged concentrically around the central shaft of the housing. The spring deflection sensor may be mounted within a recess formed within the mechanical ground of the SEA.

In one embodiment, the shaft of the spring deflection sensor may be coupled to a cable, which is fixedly attached to the front and rear portions of the housing on either side of the pair of springs. This arrangement enables the spring deflection sensor to measure the spring deflection, which because of Hooke's law (F=kx), is proportional to the force passing through the actuator and transmitted through the cable as the pair of springs compress and expand.

In one embodiment, the spring deflection sensor may be a rotary shaft position sensor having a substantially cylindrical shaped housing and a rotary shaft that extends out from one end of the cylindrical shaped housing. In such an embodiment, the recess formed within the mechanical ground may be a concave, cylindrically shaped recess having a diameter approximately equal to or slightly greater than a diameter of the cylindrical shaped housing of the spring deflection sensor.

The SEA according to the second embodiment may further include a ball nut, a ball screw, a pair of pulleys, a belt and one or more spring support mechanisms. The ball nut may be arranged within a front portion of the housing and supported by a plurality of ball bearings, which allows the ball nut to rotate within the front portion of the housing.

The ball screw may be incorporated within the front portion and the central shaft of the housing, and may be coupled to the ball nut, such that rotation of the ball nut slides the ball screw in and out of the central shaft to compress and expand the pair of springs. The pair of pulleys and belt may be coupled between the motor and the ball nut to transfer the mechanical power generated by the motor to the ball nut and the ball screw. The one or more spring support mechanisms may be arranged within an inner circumference of the springs to support the springs.

In one embodiment, the one or more spring support mechanisms may include two spring support mechanisms, which are coupled to the central shaft of the housing on opposing sides of the central shaft. Each spring support mechanism may include a guide and a rail. The rail of each spring support mechanism may be coupled to the central shaft of the housing. The guide of each spring support mechanism may be coupled to the mechanical ground of the SEA and may be configured to slide along the rail with compression and expansion of the springs.

In another embodiment, the one or more spring support mechanisms may include a single spring support mechanism, which is coupled between the front and rear portions of the housing in place of the central shaft. The single spring support mechanism may include a ball spline having a spline shaft and a spine nut. The spline shaft may be coupled between the front and rear portions of the housing in place of the central shaft. The spline nut may be coupled to the mechanical ground of the SEA and may be configured to slide along the spline shaft with compression and expansion of the springs.

BRIEF DESCRIPTION OF THE DRAWINGS

Other advantages of the present disclosure will become apparent upon reading the following detailed description and upon reference to the accompanying drawings in which.

While the present disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form disclosed, but on the contrary, the present disclosure is to cover all modifications, equivalents and alternatives falling within the spirit and scope of the present disclosure as defined by the appended claims.

DESCRIPTION OF ILLUSTRATIVE EMBODIMENTS

Improved embodiments of series elastic actuators (SEAs) are illustrated in FIGS. 1-11. In general, the improved embodiments disclosed herein solve the bulk, assembly and maintenance issues plagued by conventional SEA designs by redesigning the spring support mechanism of the actuator and restructuring how spring deflection is sensed. As set forth below, the improved SEA designs shown in FIGS. 1-11 utilize a completely different spring support mechanism, which is positioned inside an inner circumference of the springs to reduce the overall volume of the actuator, improve ease of assembly and reduce or eliminate maintenance. In addition, the improved SEA designs position a single spring deflection sensor on the mechanical ground of the actuator (instead of mounting a pair of sensors behind the actuator) to provide further reduction in actuator volume.

Figure 1:
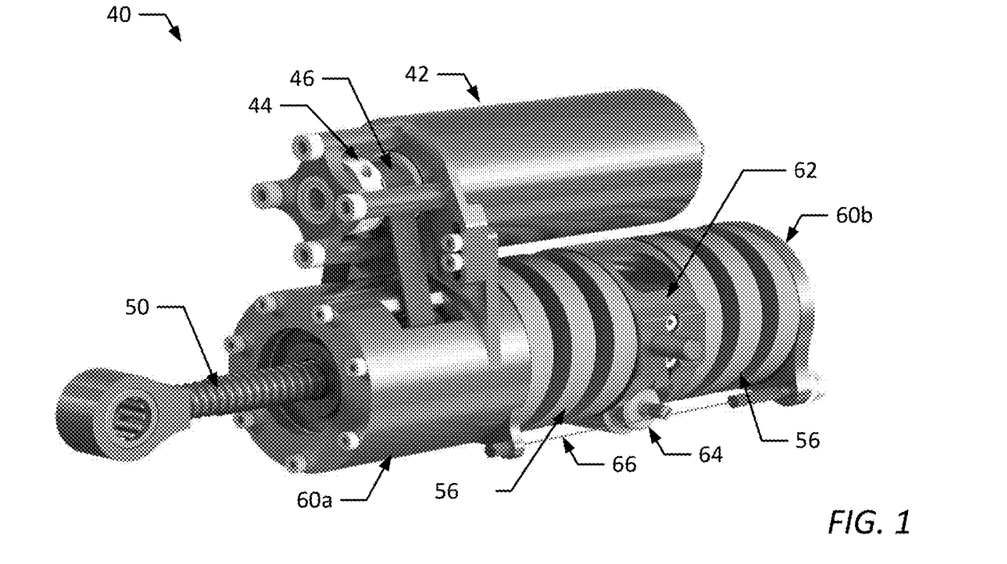
FIG. 1 is a front perspective view of a series elastic actuator (SEA), according to a first embodiment of the present disclosure.
Figure 2:
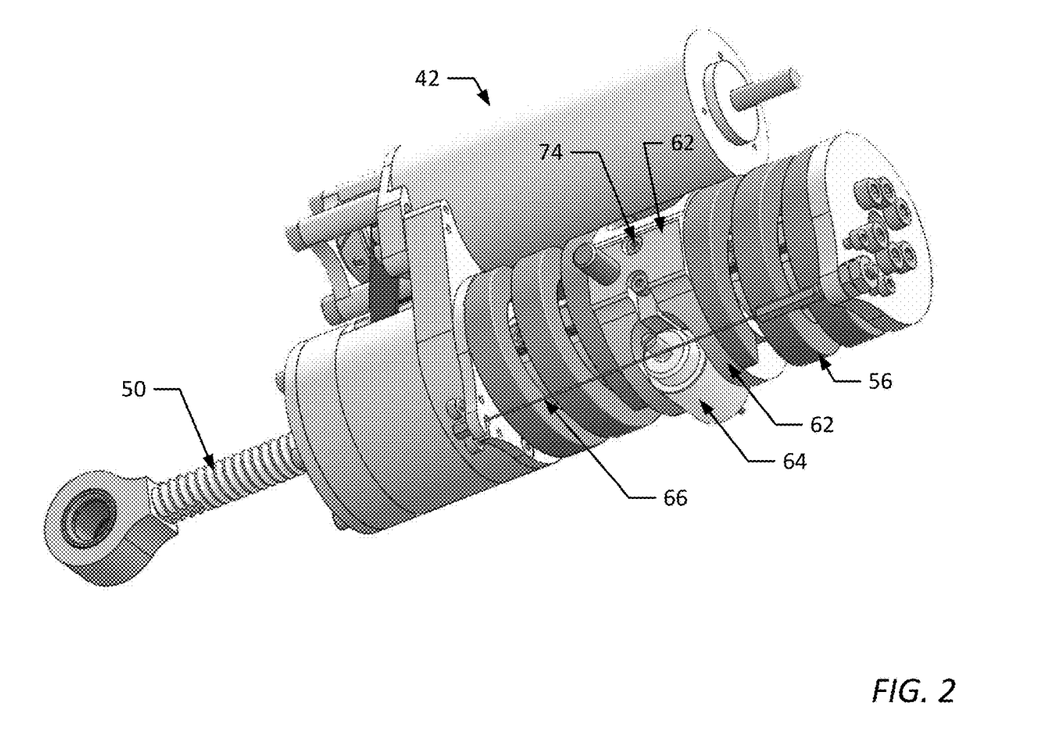
FIG. 2 is a perspective view of an underside of the SEA shown in FIG. 1.
Figure 3:
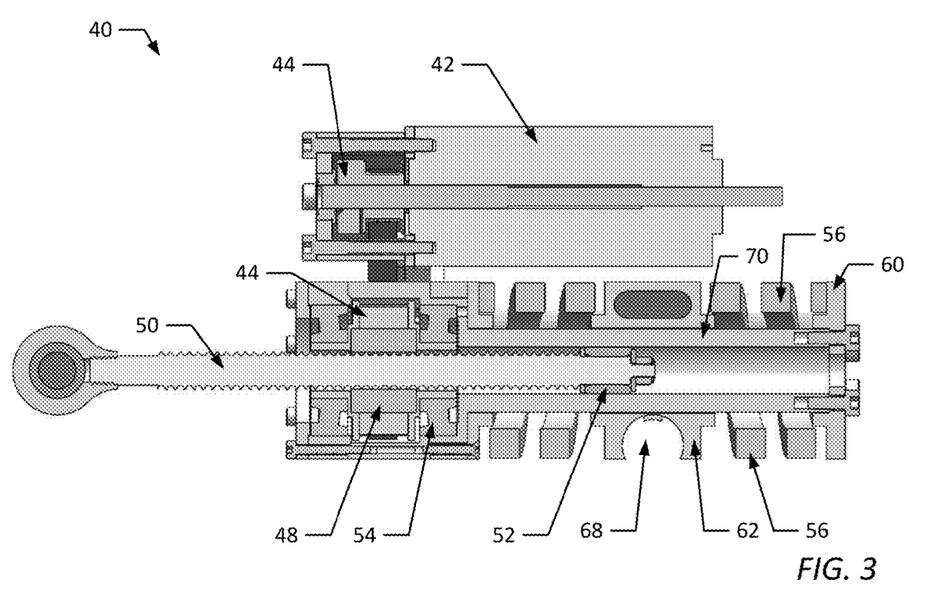
FIG. 3 is a cross-sectional view of the SEA shown in FIG. 1 taken through a longitudinal plane of the SEA.
Figure 4:
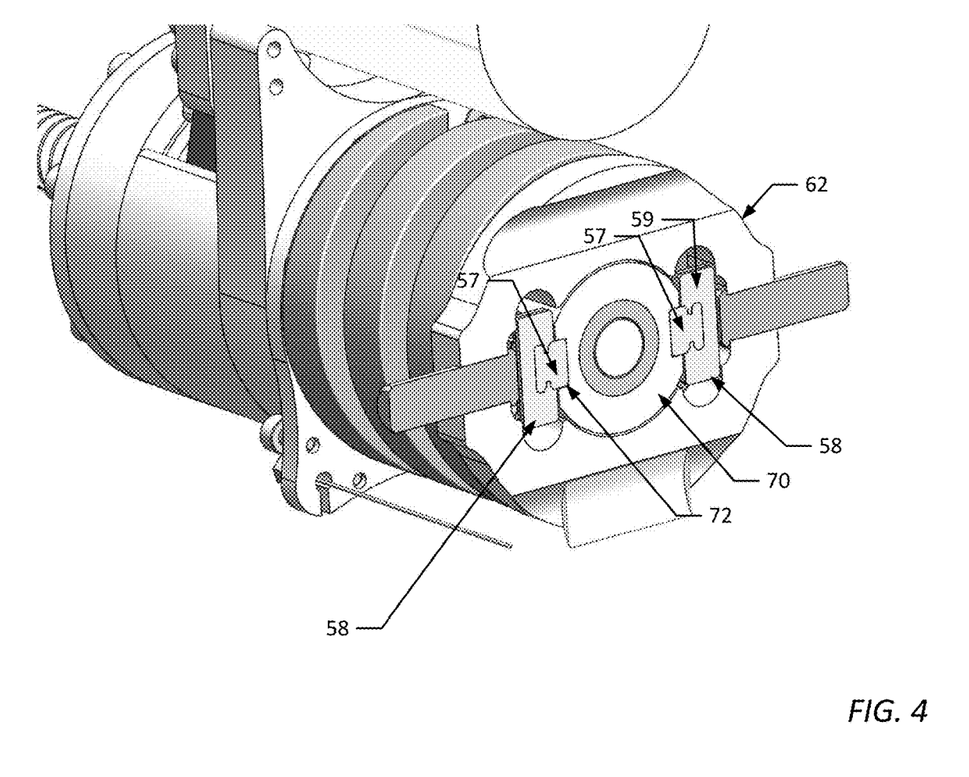
FIG. 4 is a cross-sectional view of the SEA shown in FIG. 1 taken through a transverse plane of the SEA through the mechanical ground of the actuator to show a pair of spring support mechanisms positioned inside of the high compliance springs of the SEA.

FIGS. 1 and 2 provide a front perspective and underside view, respectively, of an improved SEA 40 design according to a first embodiment of the present disclosure. FIGS. 3 and 4 provide cross-sectional views through a longitudinal plane and a transverse plane, respectively, of the improved SEA 40.

As noted above, SEAs generally contain a motor to generate mechanical power, a speed reduction mechanism to amplify motor torque, an elastic component to sense force, and a transmission mechanism to route mechanical power to the output joint. In the SEA 40 shown in FIGS. 1-4, electric motor 42 is mounted directly to a front portion 60*a* of the actuator housing 60 and used to convert electrical voltage and current into mechanical velocity and torque. In some embodiments, voltages within a range of about 48 V to about 60 V may be applied to electric motor 42 to produce a variable range of motor speeds and torques. In one example, electric motor 42 may convert an applied voltage of approximately 60 V into a maximum motor speed of about 27.2 centimeters/second (10.9 inches/second) and a maximum continuous force of about 850N. Although not limited to such, electric motor 42 may be a brushless DC motor provided, for example, by Maxon Motor AG of Switzerland, in one embodiment.

As shown in FIGS. 1-3, the transmission mechanism of SEA 40 includes a pair of pulleys 44 and a belt 46, which are coupled between electric motor 42 and ball nut 48 to transfer the mechanical energy generated by the motor to the output joint. The mechanical power generated by electric motor 42 is transferred by the transmission mechanism to drive ball nut 48 to rotate ball screw 50. The pulley ratio in SEA 40 is chosen to provide a large speed reduction (e.g., 2.5:1), which increases torque capability of the SEA and reduces the high motor speed to a speed more suitable for driving ball screw 50. In addition to being impact resistant and back-drivable, the combination of pulleys 44, belt 46, ball nut 48 and ball screw 50 provide an efficient speed reduction that may be used to maximize mechanical power at the output joint. In one example, SEA 40 may provide a maximum efficiency of about 80%, depending on load characteristics.

As shown most clearly in FIG. 3, ball nut 48 is arranged within the front portion 60a of the actuator housing 60 and supported by a plurality of angular contact ball bearings 54, which allows the ball nut to rotate within the actuator housing 60 while transmitting axial force from the ball nut to the housing. As shown in FIG. 3, ball bearings 54 are arranged alongside ball nut 48 instead of above and below the ball nut, as in the prior art SEA 10 of FIG. 13. Compared to the prior art SEA 10, arranging ball bearings 54 alongside ball nut 48 enables the diameter of the front portion 60a of the actuator housing 60 to be reduced, and allows the belt 46 to be partially enclosed within and protected by the front portion 60a of the actuator housing.

Ball screw 50 is arranged within front portion 60a and a central shaft 70 of the actuator housing 60, and is supported by a piston-style ball screw support mechanism 52 to improve stability. Rotation of the ball nut 48 slides the ball screw 50 in and out of central shaft 70, like a piston, depending on the direction of rotation. The elastic component of SEA 40 is implemented with a pair of high compliance springs 56, which are placed concentrically around the central shaft 70 of the actuator housing 60 for transmitting a linear reaction force to a mechanical ground 62 of the actuator. More specifically, the torque produce by electric motor 42 is transmitted to ball screw 50 via belt 46. Ball screw 50 transforms the motor torque into a linear reaction force, which is passed through the actuator housing 60 and the pair of springs 56 to the mechanical ground 62 of the actuator. The linear output force exerted by actuator is equal and opposite to the linear reaction force, since they are all part of the same load path to ground.

As shown in FIGS. 1-4, the mechanical ground 62 of the actuator is positioned between the pair of springs 56 and arranged concentrically around the central shaft 70 of the actuator housing 60. By positioning springs 56 and mechanical ground 62 concentrically around the ball screw 50 and piston-style ball screw support mechanism 52 incorporated within the central shaft 70, the compliant element of the SEA provides series elasticity without adding to the length of the actuator. In one example implementation, springs 56 may be preloaded die springs provided, for example, by McMaster-Carr Supply Company. For example, springs 56 may be chrome-silicon steel die springs having an uncompressed length of approximately 2 inches and a compressed length of approximately 1.2 inches at maximum load (i.e., approximately 40% deflection at maximum load). It is noted, however, that springs 56 are not limited to such an example implementation and may be alternatively implemented with other types of high compliance springs in other embodiments.

In the prior art SEA 10 design shown in FIGS. 12 and 13, four miniature ball bearing guide rails 28 are mounted on the outside of the springs 26 to provide support for the springs. In particular, opposing ends of the guide rails 28 are attached to front and rear portions of the actuator housing 30, while the collar is attached to the mechanical ground 32 of the actuator. As described in more detail below, the improved SEA 40 design shown in FIGS. 1-4 uses a completely different type of spring support mechanism 58 to support the springs 56. In addition to providing other advantages, the spring support mechanism 58 included within SEA 40 enables the transverse diameter of the mechanical ground 62 to be reduced, which in turn, reduces the overall weight of the SEA. In one embodiment, the transverse diameter of the mechanical ground 62 may be approximately equal to the transverse diameter of the springs 56, as shown in FIGS. 1-4.

Unlike the prior art SEA 10 design shown in FIGS. 12 and 13, which mounts a pair of spring deflection sensors 34 behind the rear portion of the actuator, the improved SEA 40 design shown in FIGS. 1-4 mounts a single spring deflection sensor 64 on the underside of the actuator within a recess 68 formed within the mechanical ground 62 of the actuator. This arrangement reduces the overall volume of the actuator and avoids applying significant radial loads to the shaft of the spring deflection sensor 64.

The recess 68 formed within the mechanical ground 62 of the actuator may be generally shaped and sized to accommodate the spring deflection sensor 64. In one embodiment, for example, spring deflection sensor 64 may be a rotary shaft position sensor having a substantially cylindrical shaped housing and a rotary shaft that extends out from one end of the cylindrical shaped housing. To accommodate such a sensor, recess 68 may be a concave, cylindrically shaped recess having a diameter approximately equal to or slightly greater than the diameter of the sensor housing. In one example implementation, spring deflection sensor 64 may be a low-noise, absolute, rotary shaft position sensor, such as a Vert-X series rotary shaft position sensor provided by Novotechnik. It is noted, however, that spring deflection sensor 64 is not limited to such an example implementation and may be alternatively implemented with other rotary shaft position sensors in other embodiments.

In the embodiments shown in FIGS. 1-2, the shaft of spring deflection sensor 64 is coupled to a cable 66, which is fixedly attached to the front portion 60a and rear portion 60b of the actuator housing 60 on either side of the springs 56. As the springs 56 compress and expand, spring deflection sensor 64 measures the amount of spring deflection, which because of Hooke's law ($F=kx$), is proportional to the force passing through the actuator and transmitted through the cable 66. In one example implementation, cable 66 may be a low-stretch steel cable, such as a coated or uncoated stainless steel cable provided by Sava Industries, Inc. In one particular implementation, a Sava Industries, Inc. part no. 2014SN stainless steel cable may be used to implement cable 66. It is noted, however, that cable 66 is not limited to such an example implementation and may be alternatively implemented with types and configurations of low-stretch cables in other embodiments.

The rotary shaft position sensor 64 and cable 66 shown in FIGS. 1-2, 6-7 and 10 provide a high degree of linear sensing resolution over a small displacement. has Another benefit of using a rotary shaft position sensor 64 and cable 66 is that it is relatively insensitive to other sorts of relative motions between the two sensed bodies, such as rotational torsion created by twist of the spring. That being said, however, rotary shaft position sensor 64 and cable 66 represent only one way linear displacement sensing may be accomplished in the SEA embodiments disclosed herein. Although not shown herein, other high resolution linear displacement sensors could be used in the improved SEA design.

During operation of SEA 40, spring deflection sensor 64 measures a deflection of the springs 56 as ball screw 50 slides in and out of the central shaft 70 under the control of electric motor 42, pulleys 44 and belt 46. Spring deflection sensor 64 generates a signal, based on the deflection of the springs 56, that indicates the amount of force exerted by the actuator. Although beyond the scope of the present disclosure, this signal may be transmitted to a controller coupled to electric motor 42 to create an active feedback force control loop for controlling the motor. In one embodiment, SEA 40 may be controlled using substantially any standard feedback control technique, one of which is described in N. Paine, J. Mehling, J. Holley, N. Radford, G. Johnson, C. Fok and L. Sentis, entitled "*Actuator Control for the NASA-JSC Valkyrie Humanoid Robot: A Decoupled Dynamics Approach for Torque Control of Series Elastic Robots*," herein incorporated by reference in its entirety.

As noted above, the prior art SEA 10 design shown in FIGS. 12 and 13 uses four miniature ball bearing guide rails 28, which are mounted to actuator housing 32 on the outside of the springs 26, to support the springs. The improved SEA 40 design shown in FIGS. 1-4 uses a completely different type of spring support mechanism 58 to support the springs 56. As shown in FIG. 4, for example, SEA 40 includes two spring support mechanisms 58, which are positioned within an inner circumference of springs 56. As described in more detail below, the type of spring support mechanism 58 used, coupled with the unique placement of the support mechanism 58 inside of the springs 56, reduces the overall volume of the actuator, improves ease of assembly and eliminates maintenance concerns.

Figure 5:
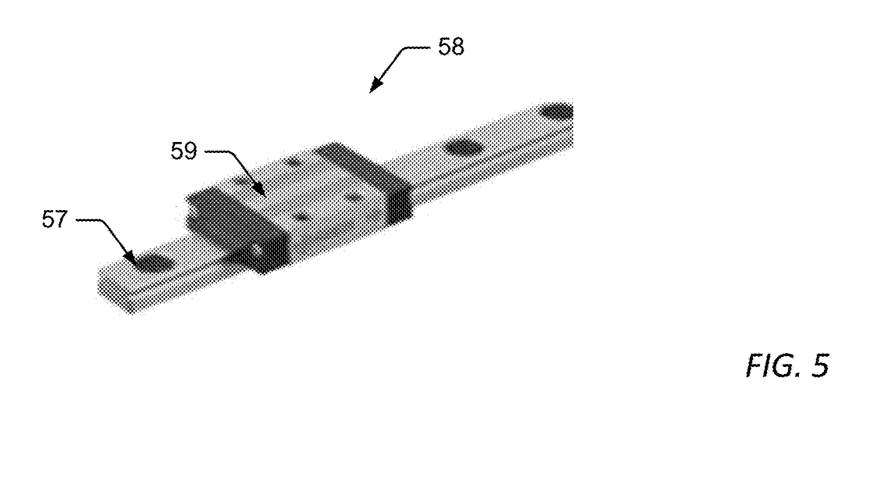
FIG. 5 is a perspective view of the spring support mechanism shown in FIG. 4.

FIG. 5 is a perspective view of the spring support mechanism 58 shown in FIG. 4. As shown in FIG. 5, spring support mechanism 58 is a linear ball bearing guide comprising a rail 57 and guide 59, which is coupled and configured to slide along the rail 57. In one example implementation, spring support mechanisms 58 may be implemented with miniature linear ball bearing guides provided, for example, by Misumi. It is noted, however, that the spring support mechanisms 58 used in SEA 40 are not limited to such an example implementation and may be alternatively implemented with types of linear ball bearing guides in other embodiments.

Figure 6:
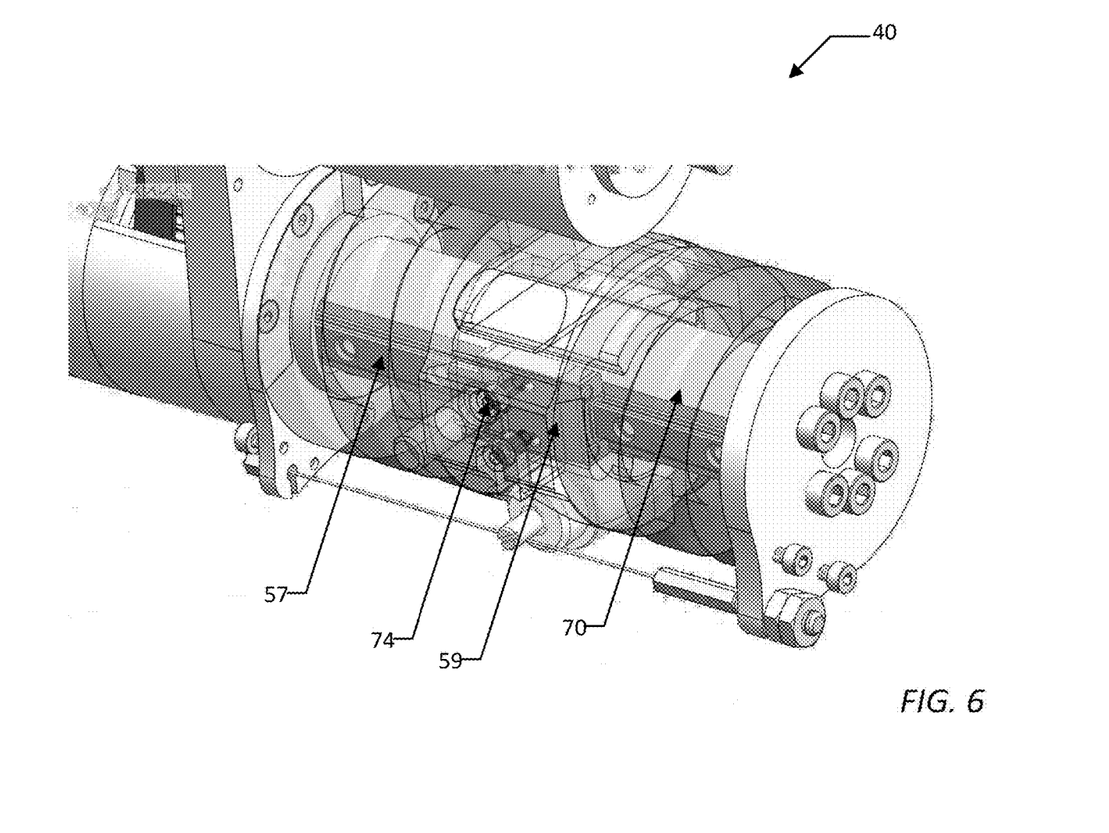
FIG. 6 is a magnified view illustrating a portion of the SEA shown in FIGS. 1-4, in which the springs and mechanical ground are rendered transparent to better illustrate the pair of spring support mechanisms arranged within the springs.

FIG. 6 is a magnified view illustrating a portion of SEA 40, in which the springs 56 and mechanical ground 62 are rendered transparent to better illustrate the pair of spring support mechanisms 58 arranged within the inner circumference of the springs. As shown in FIGS. 4 and 6, the improved SEA 40 design includes two spring support mechanisms 58 that are coupled directly to the central shaft 70 of the actuator housing 60 on opposing sides of the central shaft. More specifically, and as shown in most clearly in FIG. 4, the rail 57 of each spring support mechanism 58 is coupled within a longitudinal groove 72 formed within the central shaft 70. The guide 59 of each spring support mechanism 58 is coupled (e.g., via screws 74) to the mechanical ground 62 of the actuator, and is configured to slide along the rail 57 with spring compression and expansion. In addition to reducing the overall volume of the actuator by positioning the spring support mechanisms 58 within an inner circumference of the springs 56, the use of spring support mechanisms 58 simplifies assembly and eliminates the maintenance issues plagued by conventional SEA designs.

SEA 40 provides many advantages over other SEA designs, including but not limited to, the prior art SEA 10 design shown in FIGS. 12-13. For instance, SEA 40 provides a compact, lightweight design that fits within small design envelopes. In one embodiment, SEA 40 may have a length of less than 5 inches (fully contracted), a width of less than 1.6 inches, a height of less than 3 inches and a weight of less than 2 pounds. The compact, lightweight design of SEA 40 results in a 1.5× increase in power density compared to prior art SEA 10, and a 4× increase in power density compared to other SEA designs. SEA 40 is also fully electric, and as such, provides high efficiency (vs. hydraulic actuators) with minimum battery consumption. In one embodiment, SEA 40 may use a brushless DC motor 42, which is smaller, more efficient and optimized for torque and power. The unique combination of power density and efficiency in a compact, lightweight design enables SEA 40 to be used in a variety of high performance applications including, but not limited to, legged robotics, wearable robotics and human orthotics.

As further advantages, the series elastic configuration of SEA 40 provides shock absorption and robustness (compared to rigid drive trains), while the ball screw drive train provides high mechanical efficiency and quiet operation. The high compliance springs 56 used within SEA 40 provide energy storage and efficient operation, while the spring deflection sensor 64 provides a cleaner force signal for feedback control (compared to other SEA designs that use strain gauges). Furthermore, a controller coupled to motor 42 may be used to control the force experienced by SEA 40, thereby making the SEA reactive and adaptive to the environment. Other advantages not specifically herein may also be provided by SEA 40.

During the design of SEA 40, the present inventors noted that the ball bearings within guide 59 of spring support mechanism 58 were being overloaded, resulting in noise in the spring deflection sensor 64 readings. More specifically, friction within the spring support mechanism 58 caused a distortion of the spring compression signal, which added a direction-dependent steady state offset to the sensor readings. To resolve this issue, and to further improve ease of assembly, another embodiment of a series elastic actuator (SEA) was designed to include yet another type of spring support mechanism.

Figure 7:
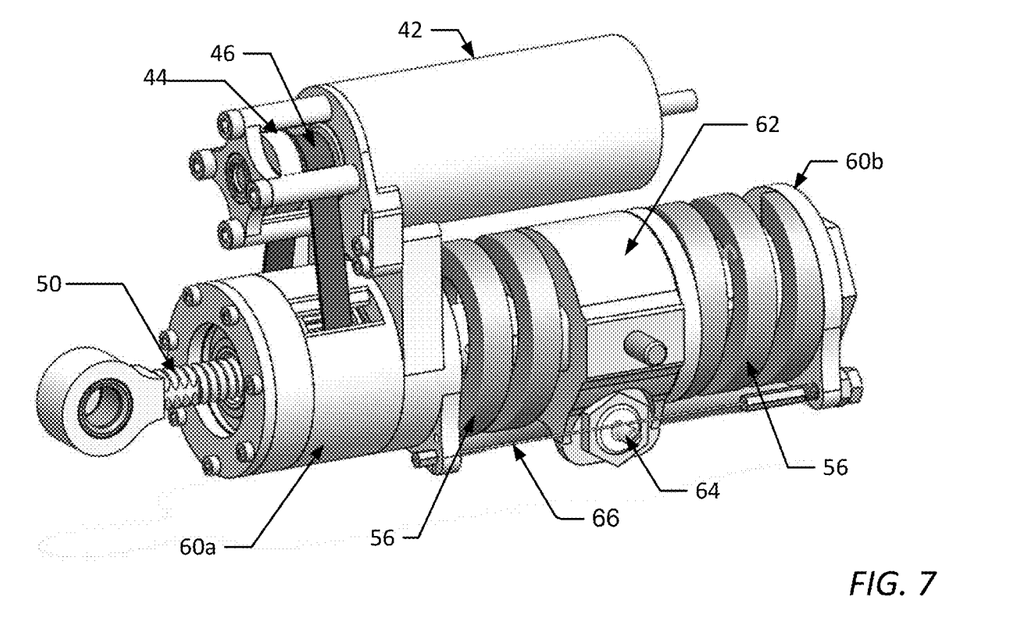
FIG. 7 is a front perspective view of a SEA, according to a second embodiment of the present disclosure.
Figure 8:
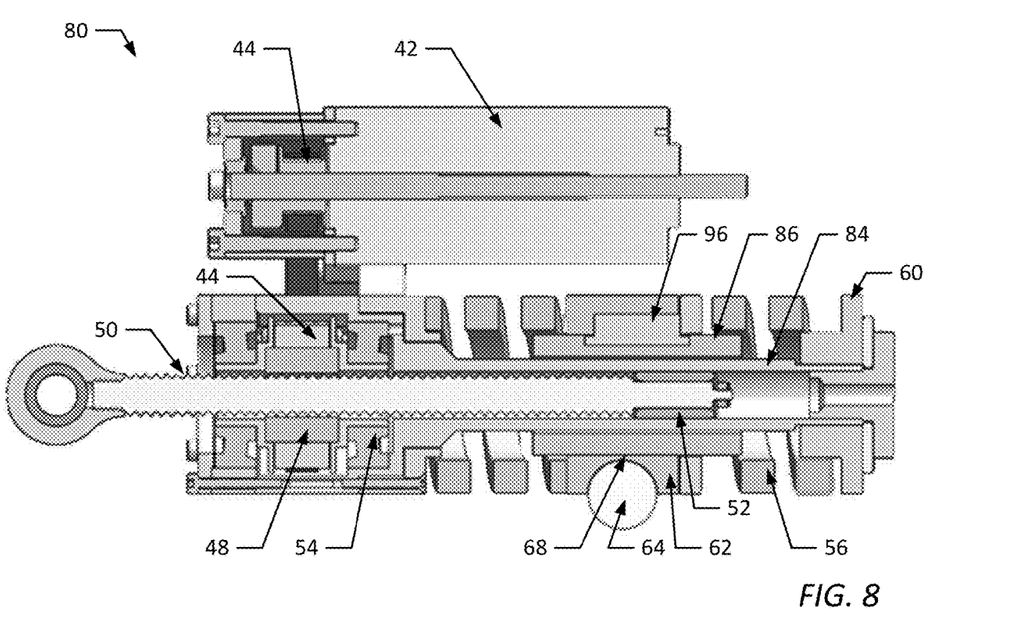
FIG. 8 is a cross-sectional view of the SEA shown in FIG. 7 taken through a longitudinal plane of the SEA.
Figure 9:
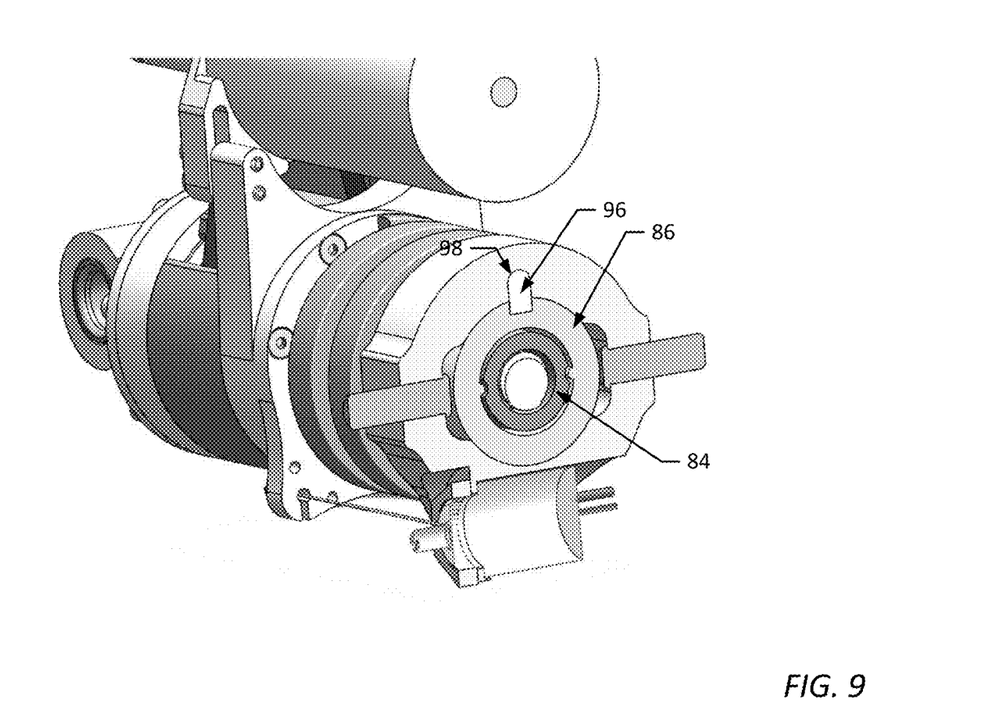
FIG. 9 is a cross-sectional view of the SEA shown in FIG. 7 taken through a transverse plane of the SEA through the mechanical ground of the actuator to show a single spring support mechanism, which is positioned inside of the high compliance springs of the SEA.

FIG. 7 provides a front perspective view of an improved SEA 80 design according to a second embodiment of the present disclosure, while FIGS. 8 and 9 provide cross-sectional views through a longitudinal plane and a transverse plane, respectively, of the SEA 80. In general, the SEA 80 design shown in FIGS. 7-9 includes many of the same components, features and advantages of the SEA 40 design shown in FIGS. 1-5 and described above. Components with like reference numerals may be similarly configured to those described in the first embodiment above, and will not be further described herein for purposes of brevity.

Like the SEA 40 shown in FIGS. 1-4, the SEA 80 shown in FIGS. 7-9 generally includes a motor to generate mechanical power, a speed reduction mechanism to amplify motor torque, an elastic component to sense force, and a transmission mechanism to route mechanical power to the output joint. More specifically, SEA 80 may generally include an electric motor 42, a pair of pulleys 44, a belt 46, a ball nut 48 a ball screw 50, a pair of high compliance springs 56 and a spring deflection sensor 64. As in the previous embodiment, electric motor 42 is mounted directly to a front portion 60a of the actuator housing 60 and used to convert electrical voltage and current into mechanical velocity and torque. The pulleys 44, belt 46, ball nut 48 and ball screw 50 transfer mechanical power from the electric motor 42 to the output joint and provide an efficient speed reduction mechanism that may be used to maximize mechanical power at the output joint. The pair of high compliance springs 56 are positioned concentrically around a central shaft 70 of the actuator housing 60 for transmitting force to the mechanical ground 62 of the actuator. The spring deflection sensor 64 is mounted to the underside of SEA 80 within recess 68 and is attached to a cable 66, which is coupled to the front portion 60a and rear portion 60b of the actuator housing 60 on either side of the springs 56. During operation of SEA 80, spring deflection sensor 64 measures a deflection of the springs 56 as ball screw 50 slides in and out of the central shaft 70 under the control of electric motor 42, pulleys 44 and belt 46.

Figure 11:
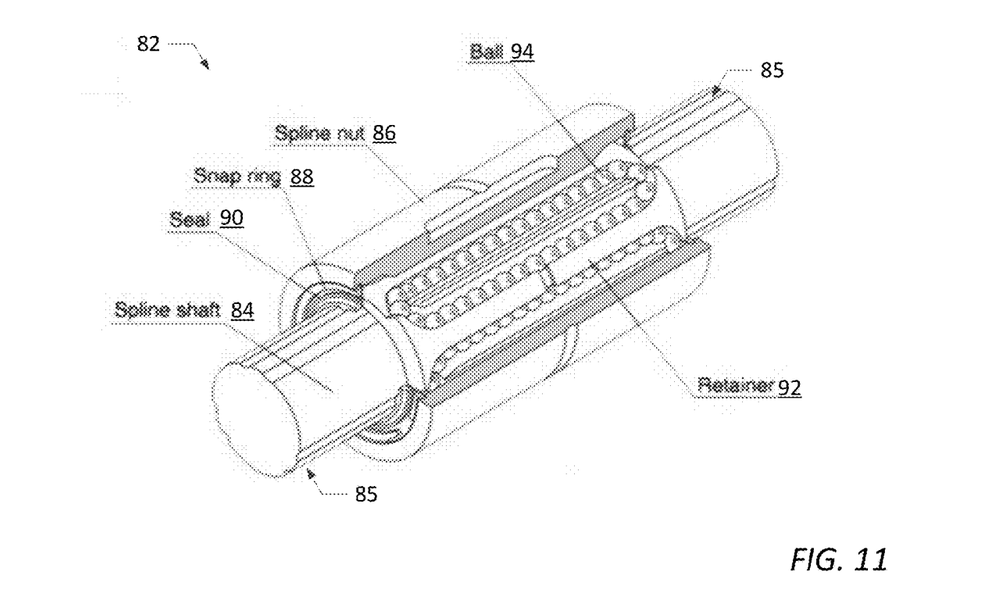
FIG. 11 is a perspective view of the spring support mechanism shown in FIGS. 9 and 10.

Unlike the pair of spring support mechanisms 58 (i.e., linear ball bearing guides/rails) used in SEA 40, SEA 80 uses a different type of spring support mechanism 82 to support the springs 56. A perspective view of the spring support mechanism 82 used in SEA 80 is shown in FIG. 11 with a portion of the spring support mechanism removed to illustrate inner components of the spring support mechanism.

As shown in FIGS. 8-11, SEA 80 includes a single ball spline 82, instead of the linear guide/rail spring support mechanisms 58 used in SEA 40. The ball spline 82 used within SEA 80 includes a spline shaft 84 and a spline nut 86. The spline nut 86, which is arranged concentrically around the spline shaft 84, slides along longitudinal grooves 85 formed within the spline shaft 84. The spline nut 86 is coupled to the spline shaft 84 via a snap ring 88 and seal 90. A retainer 92 provided within spline nut 86 provides ball recirculation, ensuring that ball bearings 94 remain within spline nut 86.

Figure 10:
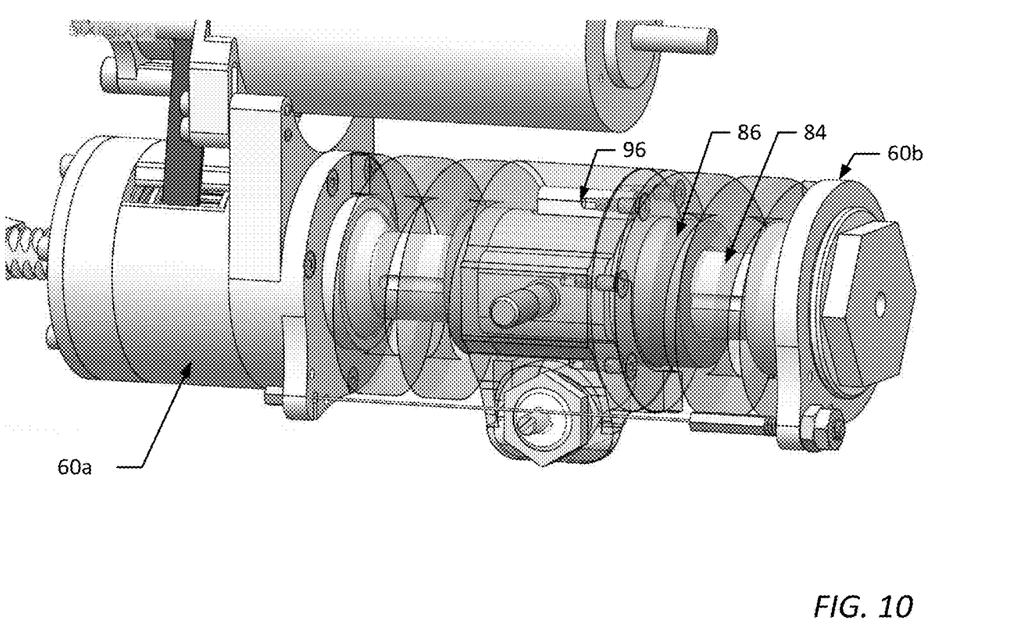
FIG. 10 is a magnified view illustrating a portion of the SEA shown in FIG. 7, in which the springs and mechanical ground are rendered transparent to better illustrate the single spring support mechanism arranged within the springs.

FIG. 10 is a magnified view illustrating a portion of SEA 80, in which the springs 56 and mechanical ground 62 are rendered transparent to better illustrate the placement of ball spline 82 within an inner circumference of the springs. As shown in FIGS. 8-10, the spline shaft 84 of ball spline 82 is coupled between the front portion 60a and rear portion 60b of the actuator housing 60 and replaces the central shaft 70 used in the SEA 40 design shown in FIGS. 3-4 and 6. The spline nut 86 slides along the longitudinal grooves 85 formed within the spline shaft 84 and has a projection 96 that mates with a groove 98 formed within the mechanical ground 62 of the actuator. This allows spline nut 86 to slide along spline shaft 84 as the springs compress and expand, and results in a design with an extremely small form factor, yet high strength.

SEA 80 provides many of the same advantages as described above for SEA 40. Like SEA 40, SEA 80 has a length of less than 5 inches (fully contracted), a width of less than 1.6 inches, a height of less than 3 inches and a weight of less than 2 pounds. As such, SEA 80 provides a compact, lightweight design that fits within small design envelopes, and provides a 1.5× increase in power density compared to prior art SEA 10, and a 4× increase in power density compared to other SEA designs. SEA 80 is also fully electric, and as such, provides high efficiency (vs. hydraulic actuators) with minimum battery consumption. In one embodiment, SEA 80 may use a brushless DC motor 42, which is smaller, more efficient and optimized for torque and power. The unique combination of power density and efficiency in a compact, lightweight design enables SEA 80 to be used in a variety of high performance applications including, but not limited to, legged robotics, wearable robotics and human orthotics.

In addition to the advantages mentioned above, SEA 80 increases the accuracy of the spring deflection sensor 64 readings by reducing friction within the spring support mechanism 82. Due to the geometry of the linear ball bearing guides 58 used in SEA 40, they provide less support for moment load about the primary axis of the actuator compared to the ball spline spring support mechanism 82 used in the SEA 80 design. Moment loads are produced by the springs 56 when they are preloaded against each other, and as the springs deflect when loads are applied by the actuator. This moment loading is transferred from the springs, through the spring guide mechanism, and then to the housing of the actuator. This moment loading produces friction in the linear guide mechanism 58. This friction is reduced in the ball spline 82 used in SEA 80, compared to the SEA 40 design, due to its larger tolerance to moment load.

The SEA 40 design also requires tight manufacturing tolerances, due to tolerance stackup between spring deflection sensor 64, spring support mechanism 58, and central shaft 70. This problem is avoided with the SEA 80 design, although it does require hardened ball bearing raceways (i.e., longitudinal grooves 85) to be machined into the housing spline shaft 84 of the ball spline 82 used in the SEA 80 design.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus, the invention is not limited to only those combinations shown herein, but rather may include other combinations.

What is claimed is:

1. A series elastic actuator (SEA), comprising:
    a housing, the housing comprising a central shaft;
    a mechanical ground;
    a motor coupled to the housing of the SEA and configured to generate mechanical power;
    an elastic component coupled in series with the motor, wherein the elastic component comprises a pair of springs arranged concentrically around the central shaft of the housing for transmitting force to the mechanical ground of the SEA; and
    a plurality of spring support mechanisms arranged within an inner circumference of the springs to support the springs, wherein each spring support mechanism from the plurality of spring support mechanisms comprises:
        a rail coupled to the central shaft of the housing; and
        a guide coupled to the mechanical ground of the SEA and configured to slide along the rail with compression and expansion of the springs.

2. The SEA as recited in claim 1, wherein the housing comprises a front portion, the SEA further comprising:
    a ball nut arranged within the front portion of the housing and supported by a plurality of ball bearings, which allows the ball nut to rotate within the front portion of the housing;
    a ball screw incorporated within the front portion and the central shaft of the housing, wherein rotation of the ball nut slides the ball screw in and out of the central shaft to compress and expand the pair of springs; and
    a pair of pulleys and a belt, which are coupled between the motor and the ball nut to transfer the mechanical power generated by the motor to the ball nut and the ball screw.

3. The SEA as recited in claim 1, wherein the mechanical ground is positioned between the pair of springs and arranged concentrically around the central shaft of the housing, and wherein a diameter of the mechanical ground is substantially equal to a diameter of the pair of springs.

4. The SEA as recited in claim 1, wherein the plurality of spring support mechanisms comprises two spring support mechanisms, which are coupled to the central shaft of the housing on opposing sides of the central shaft.

5. The SEA as recited in claim 1, wherein the rail of each spring support mechanism is coupled within a longitudinal groove formed within the central shaft.

6. The SEA as recited in claim 1, further comprising a spring deflection sensor configured to sense a force transmitted to the mechanical ground of the SEA, wherein the spring deflection sensor is coupled within a recess formed within the mechanical ground of the SEA.

7. A series elastic actuator (SEA), comprising:
a housing comprising
a front portion;
a rear portion; and
a central shaft;
a motor coupled to the housing of the SEA and configured to generate mechanical power;
an elastic component coupled in series with the motor, wherein the elastic component comprises a pair of springs, which are coupled between the front portion and the rear portion of the housing and arranged concentrically around the central shaft of the housing;
a mechanical ground positioned between the pair of springs and arranged concentrically around the central shaft of the housing;
a cable fixedly attached to the front portion of the housing and the rear portion of the housing on either side of the pair of springs; and
a spring deflection sensor mounted within a recess formed within the mechanical ground of the SEA, the spring deflection sensor comprising a shaft coupled to the cable, wherein the spring deflection sensor measures spring deflection, which is proportional to a force passing through the SEA and transmitted through the cable as the pair of springs compress and expand.

8. The SEA as recited in claim 7, further comprising:
a ball nut arranged within the front portion of the housing and supported by a plurality of ball bearings, which allows the ball nut to rotate within the front portion of the housing;
a ball screw incorporated within the front portion and the central shaft of the housing, wherein rotation of the ball nut slides the ball screw in and out of the central shaft to compress and expand the pair of springs; and
a pair of pulleys and a belt, which are coupled between the motor and the ball nut to transfer the mechanical power generated by the motor to the ball nut and the ball screw.

9. The SEA as recited in claim 7, wherein the spring deflection sensor is a rotary shaft position sensor having a substantially cylindrical shaped housing and a rotary shaft that extends out from one end of the substantially cylindrical shaped housing.

10. The SEA as recited in claim 9, wherein the recess is a concave, cylindrically shaped recess having a diameter approximately equal to or slightly greater than a diameter of the substantially cylindrical shaped housing of the spring deflection sensor.

11. The SEA as recited in claim 7, further comprising one or more spring support mechanisms arranged within an inner circumference of the springs to support the springs.

12. The SEA as recited in claim 11, wherein the one or more spring support mechanisms comprises two spring support mechanisms, which are coupled to the central shaft of the housing on opposing sides of the central shaft.

13. The SEA as recited in claim 12, wherein each spring support mechanism comprises a guide and a rail, wherein the rail of each spring support mechanism is coupled to the central shaft of the housing, and wherein the guide of each spring support mechanism is coupled to the mechanical ground of the SEA and configured to slide along the rail with compression and expansion of the springs.

14. A series elastic actuator (SEA), comprising:
a housing comprising a front portion and a rear portion;
a mechanical ground;
a motor coupled to the housing and configured to generate mechanical power;
an elastic component coupled in series with the motor, wherein the elastic component comprises a pair of springs for transmitting force to the mechanical ground of the SEA; and
a spring support mechanism coupled between the front portion of the housing and the rear portion of the housing and arranged within an inner circumference of the pair of springs to support the pair of springs, wherein the pair of springs and the mechanical ground are arranged concentrically around the spring support mechanism, and wherein a diameter of the mechanical ground is substantially equal to a diameter of the pair of springs.

15. The SEA as recited in claim 14, wherein the spring support mechanism comprises a single spring support mechanism, which is coupled between the front portion of the housing and the rear portion of the housing.

16. A series elastic actuator (SEA), comprising:
a housing comprising a front portion and a rear portion;
a mechanical ground;
a motor coupled to the housing and configured to generate mechanical power;
an elastic component coupled in series with the motor, wherein the elastic component comprises a pair of springs for transmitting force to the mechanical ground of the SEA; and
a spring support mechanism coupled between the front portion of the housing and the rear portion of the housing and arranged within an inner circumference of the pair of springs to support the pair of springs, the spring support mechanism comprising a ball spline having a spline shaft and a spline nut, wherein the spline shaft is coupled between the front portion of the housing and the rear portion of the housing, and wherein the spline nut is coupled to the mechanical ground of the SEA and configured to slide along the spline shaft with compression and expansion of the springs.

17. The SEA as recited in claim 16, wherein the spline nut slides along longitudinal grooves formed within the spline shaft, and wherein the spline nut comprises a projection that mates with a groove formed within the mechanical ground of the SEA.

18. The SEA as recited in claim 16, wherein the spring support mechanism comprises a single spring support mechanism, which is coupled between the front portion of the housing and the rear portion of the housing.

19. The SEA as recited in claim 16, further comprising a spring deflection sensor configured to sense a force transmitted to the mechanical ground of the SEA, wherein the spring deflection sensor is coupled within a recess formed within the mechanical ground of the SEA.

20. A series elastic actuator (SEA), comprising:
- a housing comprising
  - a front portion;
  - a rear portion; and
  - a central shaft;
- a motor coupled to the housing of the SEA and configured to generate mechanical power;
- an elastic component coupled in series with the motor, wherein the elastic component comprises a pair of springs, which are coupled between the front portion and the rear portion of the housing and arranged concentrically around the central shaft of the housing;
- a mechanical ground positioned between the pair of springs and arranged concentrically around the central shaft of the housing; and
- a spring deflection sensor mounted within a recess formed within the mechanical ground of the SEA, wherein the spring deflection sensor is a rotary shaft position sensor having a substantially cylindrical shaped housing and a rotary shaft that extends out from one end of the substantially cylindrical shaped housing.

21. The SEA as recited in claim 20, wherein the recess is a concave recess having a diameter approximately equal to or slightly greater than a diameter of the substantially cylindrical shaped housing of the spring deflection sensor.

* * * * *